(12) United States Patent
Liu et al.

(10) Patent No.: US 8,505,469 B2
(45) Date of Patent: Aug. 13, 2013

(54) ALL IN ONE MULTIFUNCTION PALLET

(76) Inventors: Xue Wu Liu, Bloomington, CA (US); Rui Li, Bloomington, CA (US)

( * ) Notice: Subject to any disclaimer, the term of this patent is extended or adjusted under 35 U.S.C. 154(b) by 379 days.

(21) Appl. No.: 12/728,243

(22) Filed: Mar. 21, 2010

(65) Prior Publication Data

US 2011/0061572 A1    Mar. 17, 2011

(30) Foreign Application Priority Data

Sep. 14, 2009    (CN) .......................... 2009 1 0177769

(51) Int. Cl.
*B65D 19/12*    (2006.01)

(52) U.S. Cl.
USPC ..... 108/56.3; 108/50.11; 108/55.1; 108/56.1; 108/57.26; 108/55.5

(58) Field of Classification Search
USPC .................. 108/51.11, 55.1, 55.3, 56.1, 56.3, 108/57.21, 57.26, 57.29, 55.5, 127, 129; 248/678, 346.02, 499, 505; 206/600, 599, 206/597, 386
See application file for complete search history.

(56) References Cited

U.S. PATENT DOCUMENTS

| | | | | |
|---|---|---|---|---|
| 1,181,377 A * | 5/1916 | Dowell | ................ | 410/97 |
| 2,101,573 A * | 12/1937 | Cramer et al. | ................ | 108/64 |
| 3,511,191 A | 5/1970 | Barry, Jr. et al. | | |
| 3,711,174 A * | 1/1973 | Davis et al. | ................ | 312/194 |
| 3,719,157 A | 3/1973 | Arcocha et al. | | |
| 4,890,560 A * | 1/1990 | Good | ................ | 108/53.1 |
| 5,056,666 A | 10/1991 | Janssens | | |
| 5,067,418 A | 11/1991 | Carter | | |
| 5,105,746 A * | 4/1992 | Reynolds | ................ | 108/56.1 |
| 5,178,075 A * | 1/1993 | Kanazawa | ................ | 108/56.1 |
| 5,337,681 A | 8/1994 | Schrage | | |
| 5,401,347 A | 3/1995 | Shuert | | |
| 5,423,428 A * | 6/1995 | Selz | ................ | 206/597 |
| 5,941,179 A | 8/1999 | Herring | | |
| 6,216,607 B1 * | 4/2001 | Cuddy | ................ | 108/55.5 |
| D446,900 S | 8/2001 | Koefelda et al. | | |
| 6,311,371 B1 * | 11/2001 | Dazzo | ................ | 24/20 R |
| 6,418,861 B1 * | 7/2002 | Flam | ................ | 108/56.1 |
| 6,821,068 B2 * | 11/2004 | Facey et al. | ................ | 410/100 |
| 7,197,989 B2 | 4/2007 | Apps | | |
| 7,255,239 B2 | 8/2007 | Liu et al. | | |
| 7,311,484 B2 * | 12/2007 | Facey et al. | ................ | 410/100 |
| 7,779,764 B2 * | 8/2010 | Naidu et al. | ................ | 108/57.26 |
| 7,802,527 B2 * | 9/2010 | Dong | ................ | 108/56.1 |
| 2006/0065171 A1 * | 3/2006 | Oishi | ................ | 108/51.11 |
| 2008/0103944 A1 * | 5/2008 | Hagemann et al. | ................ | 705/28 |
| 2009/0145339 A1 * | 6/2009 | Dubois et al. | ................ | 108/56.1 |
| 2011/0061572 A1 * | 3/2011 | Liu et al. | ................ | 108/55.5 |

FOREIGN PATENT DOCUMENTS

CN    ZL200910177769.X    4/2011

* cited by examiner

*Primary Examiner* — Darnell Jayne
*Assistant Examiner* — Daniel Rohrhoff

(57) ABSTRACT

A collapsible, reusable and repairable pallet is composed of a plate(s) with penetrative holes and various of grooves. The pallet is composed of a numbers of supporting legs, at least two joint shifts, a plurality of nuts, a number of belts, different types of RFID tags and renewable batteries. The collapsible pallet results the zero space waste in pallet collection, storage and transportation for further application. Any damaged part of the pallet can be replaced with a new part, including the plate(s), the supporting legs, the belts, the joint shifts, the nuts, the RFID tags and the batteries.

31 Claims, 10 Drawing Sheets

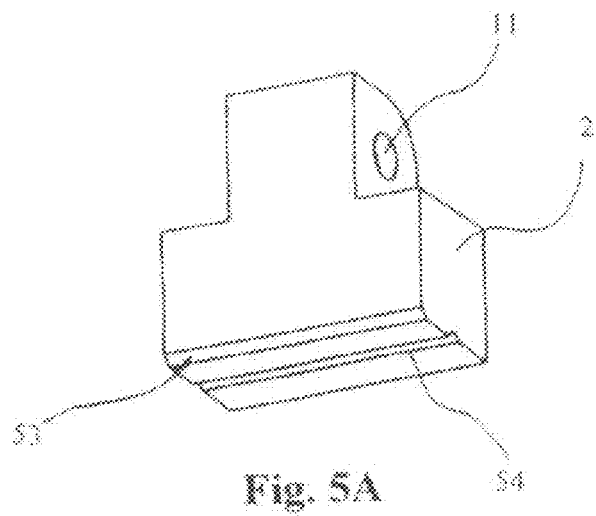
Fig. 5A
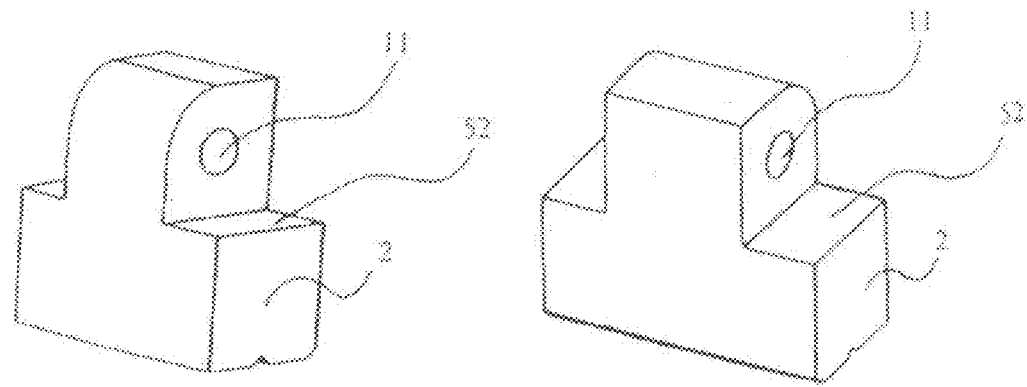
Fig. 5B
Fig. 5C

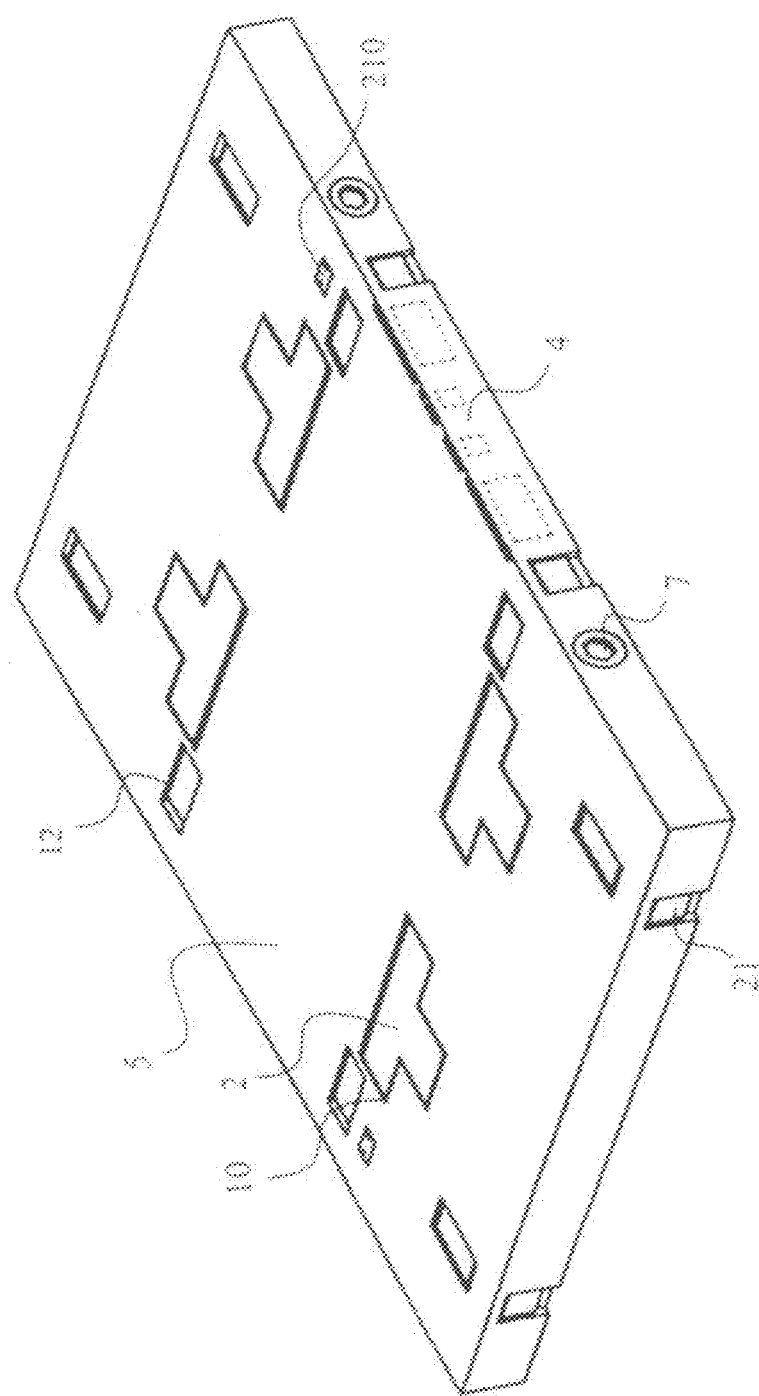

ALL IN ONE MULTIFUNCTION PALLET

CROSS REFERENCE TO RELATED APPLICATIONS

This application claims the priority of P.R. China Patent Application, Application Serial No.: CHINA200910177769.X, filed on the day of Sep. 14, 2009 and the application becomes P. R. China Patent (ZL. 2009 1 0177769.X) on the day of Apr. 13, 2011. The present application is further incorporated and related to U.S. Pat. No. 7,255,239.

FIELD OF THE INVENTION

This invention relates to a collapsible, reusable and repairable pallet equipped with RFID Tag (s) for the supply chain management.

BACKGROUND OF THE INVENTION

A pallet is a flat transport structure used to keep products in a stable state when being loaded, unloaded or moved from one place to another either by use of a forklift, pallet jack, front loader or other similar device. Since the first U.S. patent related to a pallet function was filed in 1924, pallets have been proved to be a most useful and convenient structure in modern supply chain system for handling, storage and shipping a myriad of different products worldwide.

Schrage (U.S. Pat. No. 5,337,681) pointed out at least five shortcomings of incorporating pallet application: such as difficulty to collect, sanitary problems, safety, heavy weight and inconvenience in securing of the stacked goods to the pallets by typically using wrapping sheet of the stretch film or binds.

The use of Radio Frequency Identification (RFID) tag(s) on pallets has been recently used in the retail industry. One such retailer is the world-wide retail giant Wal-Mart. Other entity that has incorporated RFID tags in a large scale is the United States Department of Defense (DOD). Some other companies have attempted to add a prewritten or pre-coded RFID tag to help buyers to know what types of products are bound on each pallet and to improve their inventory control. However these types of pallets with RFID tags have not being widely used in today's supply chain and logistics management.

SUMMARY OF THE INVENTION

In accordance with the preferred embodiment of the invention, there is disclosed the present invention which is aimed to solve the above problems and disadvantages related pallet application for product moving in the supply chain.

In one or more aspects of the embodiments, the collapsible, reusable and repairable pallet is composed of a plate(s) with penetrative holes and various types of grooves. The penetrative holes and the various types of grooves are used for the joint shafts, the nuts, the belts, the supporting legs, the different type of RFID tags and batteries to construct the collapsible, reusable and repairable pallet for product moving in the supply chain. The collapsible function of the pallet results in zero space waste in pallet collection and transportation for reapplication, which will significantly lower the cost for all users and suppliers for product transaction in the supply chain.

In one or more aspects of embodiments, RFID tag(s) are embedded onto the collapsible and reusable pallet. This solved many problems related to RFID technology application in domestic and international trade. All applied RFID tags, including active RFID tag, semi-passive RFID tag and passive RFID tag, can be reused with collapsible and reusable pallet. The RFID technology and RFID tags application will surely help both the products transaction and the pallet recovery worldwide at an effective and efficient way. The batteries used to power an active and/or a semi-passive RFID tags are separated from RFID tags, of which will lower the cost by using different batteries.

In one or more aspects of embodiments, any part of a pallet can be replaced with a new part if damaged during the use for products transaction in the supply chain, including the plate (s), the supporting legs, the joint shafts, the nuts, the belts, the RFID tag(s) and the batteries.

Still other objects, features, and attendant advantages of the present invention will become apparent to those skilled in the art from reading the following detailed description of embodiments constructed in accordance with the accompanying drawings.

BRIEF DESCRIPTION OF THE DRAWINGS

FIG. 9 is a top and front view of the fully collapsed pallet.

PREFERRED EMBODIMENT AND DETAILED FOR THE INVENTION

Figure 1:
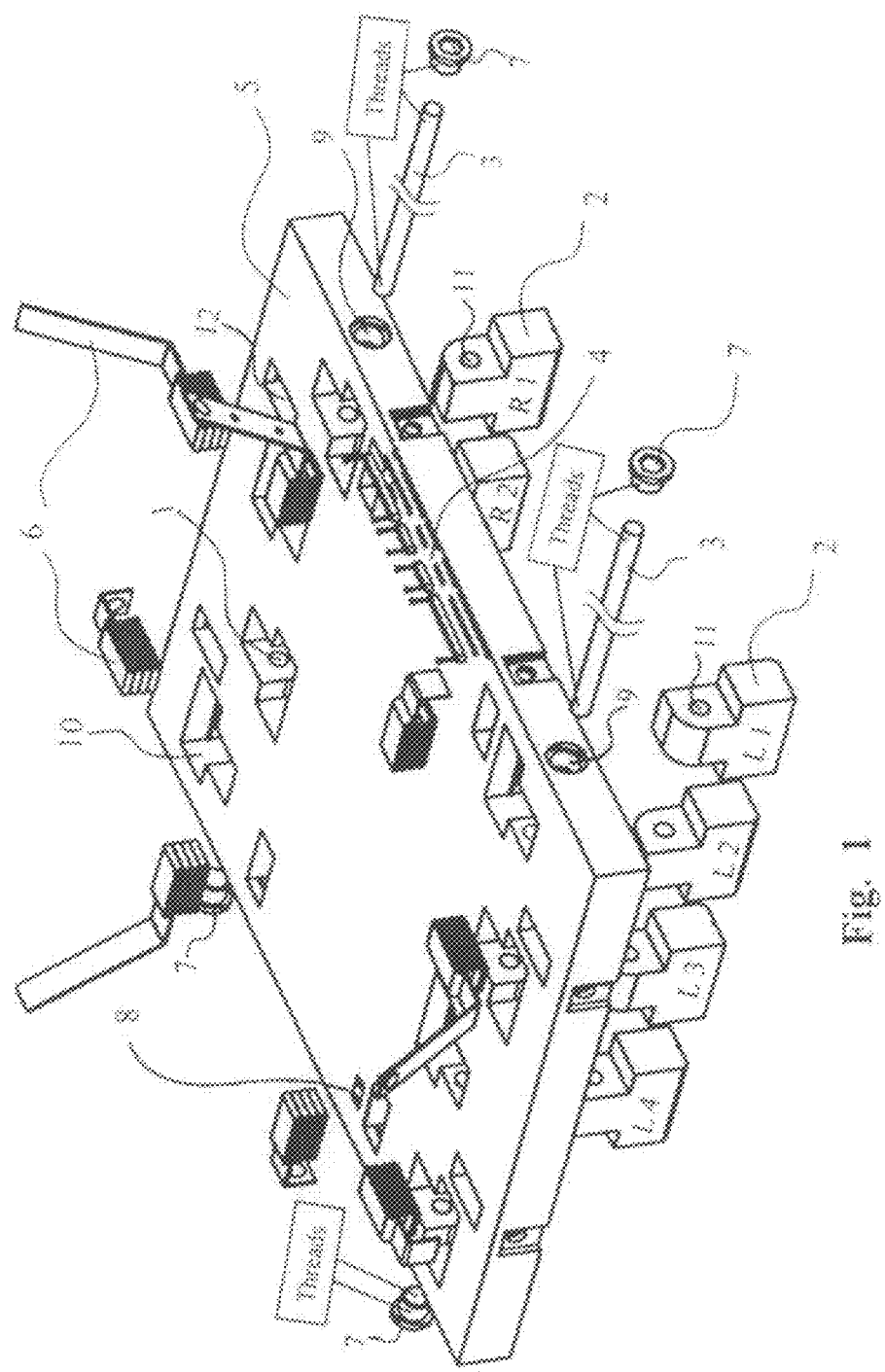
FIG. 1 is an exploded view of the collapsible, reusable and repairable pallet.

The exploded view of the collapsible, reusable and repairable pallet, as shown in FIG. 1, demonstrates the basic and typical design in the present invention. The plate 5 of the pallet has shown the most principle of the structure of the pallet. The front and top view indicates the place and location of the grooves 10 for keeping the supporting legs 2. The groove 10 allows the supporting leg to be kept fully in the groove when the pallet is fully folded or collapsed. The supporting legs 2 are joined by the joint shaft 3 through the hole 11 on the top portion of the supporting leg and the hole 1 inside the plate 5. Both the holes, 1 inside the plate 5 and 11 on the top portion of the supporting leg 2, are penetrative holes and are used for the joint shaft 3 to pass through. The joint shaft 3 is parallel to screw with the nuts 7 via the threads as shown in the box. Such design, to fix supporting leg 2 to the plate 5 of the pallet, provides an easy way to change any damaged supporting leg 2. The joint shaft 3 is to make the plate 5 stronger by using different materials from the plate 5 (it functions and looks like the concrete with reinforcing bar to make the building stronger). As shown in the box, the nuts 7 can be fastened with the plate 5 via the threads. The groove 9 on the side of the plate 5 of the pallet is used to keep the nut 7. The groove 9 also enable to keep the nut 7 at the same level as the side of the plate 5 of the pallet, which makes the whole pallet more smooth and convenient for the pallet application.

RFID active tag, RFID Semi-passive tag and the batteries are embedded to the groove and fixed with the sealing washer and the lid by using plastic screws. The area 4 is to place the active RFID tag, the semi-passive RFID tag and the batteries on the plate 5 of the pallet. The place can be on the top as 4 or the flank of the plate 5 of the pallet. The groove 8 is used for placement of a passive RFID tag on the top of the plate 5. The passive RFID tag can be also placed on the side of the plate 5 of the pallet. Each pallet can be equipped with any one of three types of RFID tags, or any two of three types RFID tags or all three types RFID tags according to the application and purpose of the pallet to be used for the handling various products and for the different levels of management requirement. For special requirement and purpose, any other device can be embedded to the pallet as the way for RFID tags described in present invention.

There are eight grooves 12 on the plate 5 of the pallet to keep each correspondent belt 6 after unloading of the transported products.

The supporting legs 2 on the left side (L1, L2, L3 and L4) of the pallet can be placed in the opposition direction to the supporting legs 2 on the right side (R1 and R2). The same side of the nearby supporting legs 2 can be placed in different directions as shown L1 and L2. The supporting leg 2 can be also assembled in the manner on the left side in the same directions as the right side and the nearby legs (L1 and L2) will be different in direction. This will help the pallet to be stable during the product transportation since the legs are in the different collapsed directions and all the legs can grip each other.

Figure 2:
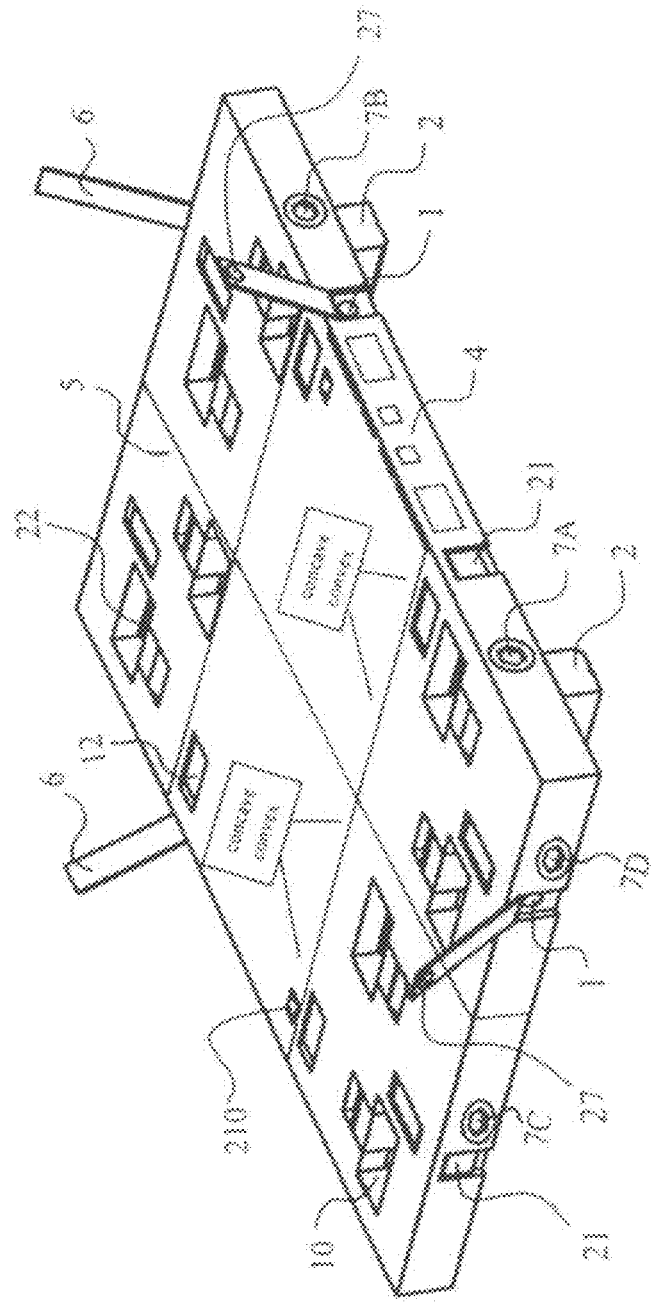
FIG. 2 is a top and front perspective view of the fully opened collapsible, reusable and repairable pallet.

FIG. 2 shows a well assembled and fully opened pallet. The grooves 10 are used to keep supporting legs 2 on the plate 5. This arrangement will keep all supporting legs to protect each other and further to keep the pallet in the stable state, since the supporting legs 2 are opened in different directions. For example, the left supporting legs (L1, L2, L3 and L4 as shown in FIG. 1) opposites each other in opening direction, and the left supporting leg (L1 as shown in FIG. 1) opposites to the right leg (R1 as shown in FIG. 1). If there is a movement during the transportation or a force to push the pallet from left to right, for example, the left supporting leg (L1) will be protected by the right leg (R1), and the nearby supporting legs will protect each other (L1 and L2). The groove 10 has a convex structure 22 to grip the concave structure (54 in FIG. 5) on the bottom plane of the supporting leg 2. Both the convex structure 22 and concave structure (54 in FIG. 5) grip each other when the supporting leg 2 is fully collapsed.

The plate 5 is made of six plates. As shown in the box, the convex structures on one plate are mated with concave structures on the other plate. The mated concave and convex structures are fixed vertically with screw on both sides of the concave and the convex structures to prevent the jointed plates moving backward. The detailed structures of the concave on the one plate and the convex on the other plate have been disclosed in FIG. 5, 53 and FIG. 11, 101 respectively in the previous U.S. patent (U.S. Pat. No. 7,255,239).

The joint shafts 3 (inside the plate 5) screwed with nuts 7A, 7B, 7C and 7D here are another way to tie these six plates together and further to support the plate 5 in the parallel perpendicular arrangement. The nuts 7A, 7B, 7C and 7D are finally fixed with the groove 9 (as shown in FIG. 1) on the side the plates.

Figure 6:
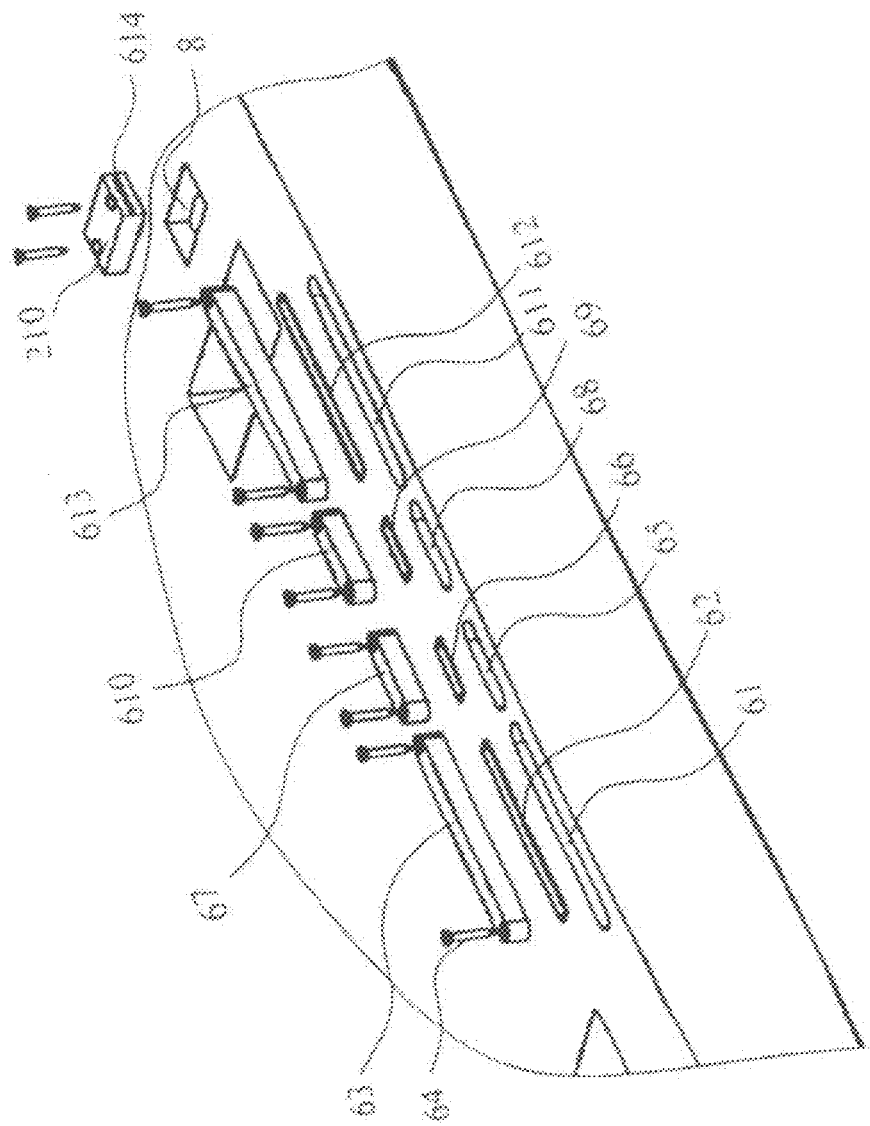
FIG. 6 is a partial exploded view of the grooves, the lids and the sealing washers used to fix the RFID tags and the batteries on the plate of the pallet.

The active RFID tag, semi-passive RFID tag and batteries 4 can be either placed on the top or the flank of the plate 5 of the pallet as desired. The passive RFID tag is first inserted to a narrow groove 614 (as shown in FIG. 6) on the rectangle plate plastic 210, of which is finally fixed into the groove 8 (as shown in FIG. 1) on the plate 5.

The belt 6 has round metal plate 27 on the outside end. The round metal plate 27 is used to mate with the groove 31. 21 shows the fully recovered belt 6 in the shallow groove 42 (as shown in FIG. 4A).

Figure 3:
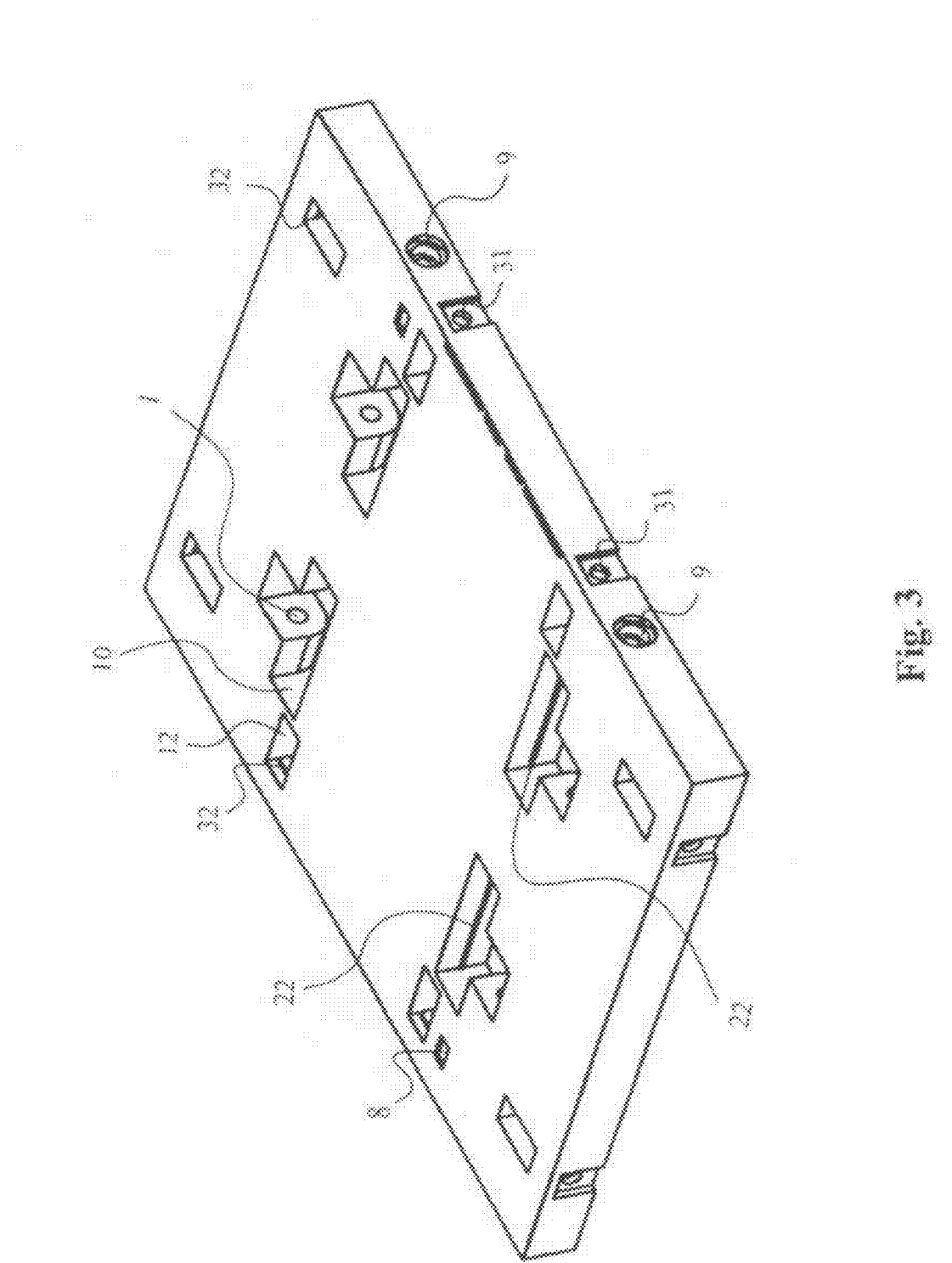
FIG. 3 shows the detailed structures of the plate.

FIG. 3 is a top front perspective view of the plate, of which all functional parts, such as the supporting legs 2, the belts 6, the joint shafts 3, the nuts 7, the RFID tags and the batteries, are removed from the plate 5. The grooves 9 are used for the nuts 7 (as shown in FIG. 1 and FIG. 2). The grooves 31 are used to hold the round metal plate 27. The area 4 is used to fix the active RFID tag, semi-passive RFID tag and batteries. The groove 8 is used to keep a passive RFID tag. The grooves 10 are used to keep the collapsed supporting legs 2. The convex structure 22 correspondingly hold the concave structure 54 (as shown in FIG. 5) on the plane of each supporting leg 2 when the supporting leg 2 is fully folded. The penetrative hole 1 inside the plate 5 and the penetrative hole 11 (as shown in FIG. 1) on top portion of the supporting leg 2 allow the joint shaft 3 to pass through and to couple the supporting leg 2 with the plate 5 (as shown in FIG. 5). The belt 6 can be kept in each correspondent groove 12 when fully recovered after using to bind the goods with the pallet. The directing groove 32 on the outside of the groove 12 allows each belt 6 being pulled out from the groove 12 or recovered from the outside to the groove manually after using.

Figure 4A:
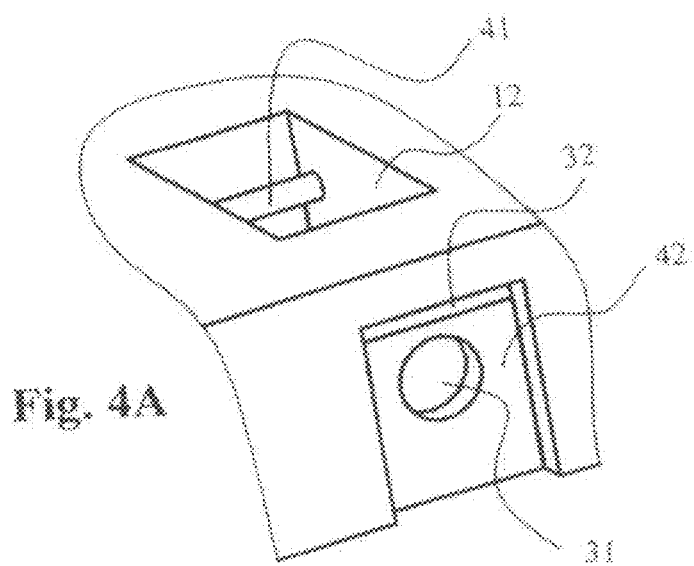
FIG. 4A is a top and front view of the groove used to keep the belt and FIG. 4B is a cutaway view of the fully recovered belt in the groove.

FIG. 4A is a partial draw to detail the groove used to keep the belt. The directing groove 32 allows each belt 6 to be pull out from the groove 12 or to be recovered from the outside via the directing groove 32 to the groove 12. The groove 31 is used to hold the round metal plate 27 when the belt 6 is fully recovered. The rod 41 is used to fix one end of the belt 6. The fully recovered belt 6 is tidily kept in the shallow groove 42 (as indicated by 21 in FIG. 2).

Figure 4B:
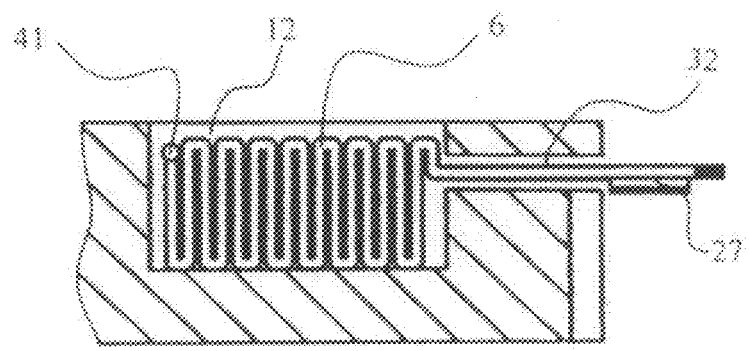
Figure 5D:
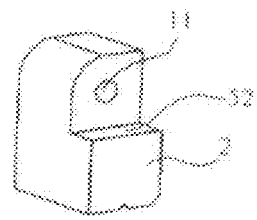
FIG. 5 shows a different direction view of the structures of the supporting legs.
Figure 5E:
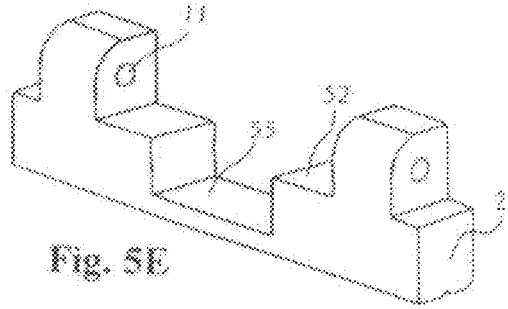
Figure 5F:
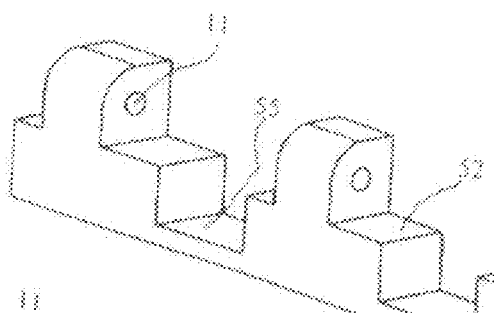
Figure 5G:
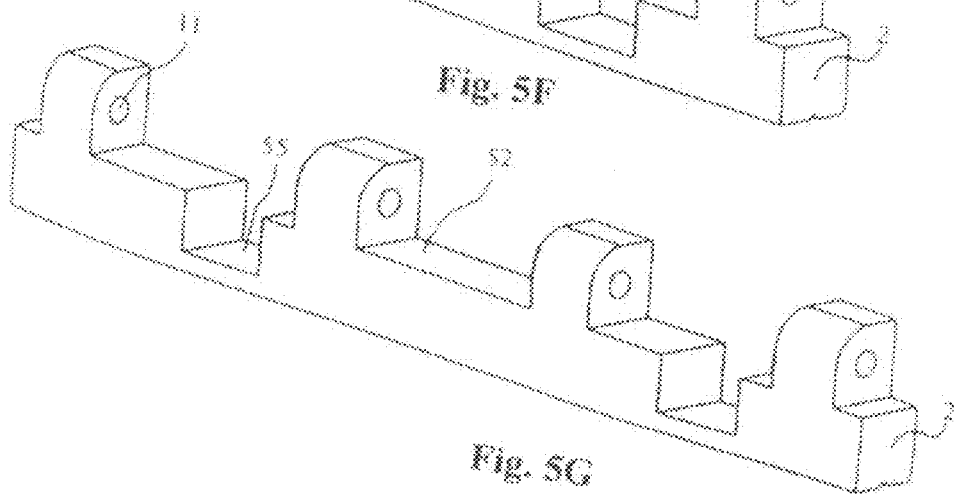

FIG. 4B is the cut away illumination to show the recovered belt. One end of the belt 6 is fixed on the fix rod 41 inside the groove 12 and the other end is kept outside the directing groove 32. Each end of the outside belts 6 is stopped on the location of the round metal plate 27 which will mate with the groove 31.

FIG. 5 shows the basic structure of the collapsible supporting leg in different direction view.

FIG. 5 A is a bottom and up view of the supporting leg 2. The top portion of the convex structure has a penetrative hole 11 which can be joined to the correspondent penetrative hole 1 in the plate 5 of the pallet via the joint shafts 3. On the bottom plane of the supporting leg 2, there is a concave structure 54 used to grip with a convex structure 22 when the supporting leg 2 being fully collapsed. On the bottom plane of the supporting leg 2, there is an oblique section 53 to allow the supporting leg 2 smoothly and freely to be pushed out and passed through the correspondent edge on the groove 10. It is possible to change the same oblique tangent on the supporting leg 2 to the bottom of the groove 10 for the same purpose.

FIG. 5 B is a front view of the supporting leg. The supporting leg 2 comprises two supporting shoulders 52 to support the plate 5 vertically. The 45 degree curve, from the ½ top plane of the supporting leg 2, on the top portion of the convex structure allows the supporting leg 2 to be pushed out from the groove 10 on the plate of the pallet smoothly and further turn 90 degree to support the bottom plane of the plate 5 with the plane of the supporting shoulder 52.

FIG. 5 C is a back view of the supporting leg 2.

FIG. 5 D is a front view of the supporting leg 2 with one supporting shoulder 52.

FIG. 5 E is a front view of the supporting leg 2 with four supporting shoulders 52. There is a concave structure 55 between the second and third supporting shoulders 52 to allow a forklift to lift the pallet from any of four directions.

FIG. 5 F is a front view of the supporting leg 2 with six supporting shoulders 52. Two concave structures 55 are located in places between the second and the third and between the fourth and the fifth of the supporting shoulders 52 respectively. Such design will allow the forklift to lift the pallet from any of four directions.

FIG. 5 G is a front view of the supporting leg 2 with seven supporting shoulders 52. The concave structure 55 allows the forklift or any similar device to lift the pallet from any of four directions.

FIG. 6 is a partial exploded view of the plate 5 of the pallet to show the detail structures used to fix the RFID tags and the batteries. The grooves 61 and 611 are used to place an active RFID tag and a semi-passive RFID tag respectively. The sealing washers 62 and 612 are used to protect the active RFID tag and the semi-passive RFID tag from water or moisture. The lids 63 and 613 are used to fix both the active RFID tag and the semi-passive RFID tag with the plastic screw 64. The grooves 65 and 68 are the places to keep the batteries to power both the active RFID tag and the semi-passive RFID tag. The sealing washers 66 and 69 are used to protect the batteries from water and moisture. The lids 67 and 610 are used to fix the batteries with the plastic screw 64. The passive RFID tag is first inserted to a narrow groove 614 on the rectangle plastic plate 210, which is fixed to the groove 8 (as showed in FIG. 1) on the plate 5 of the pallet with plastic screws 64.

Figure 7:
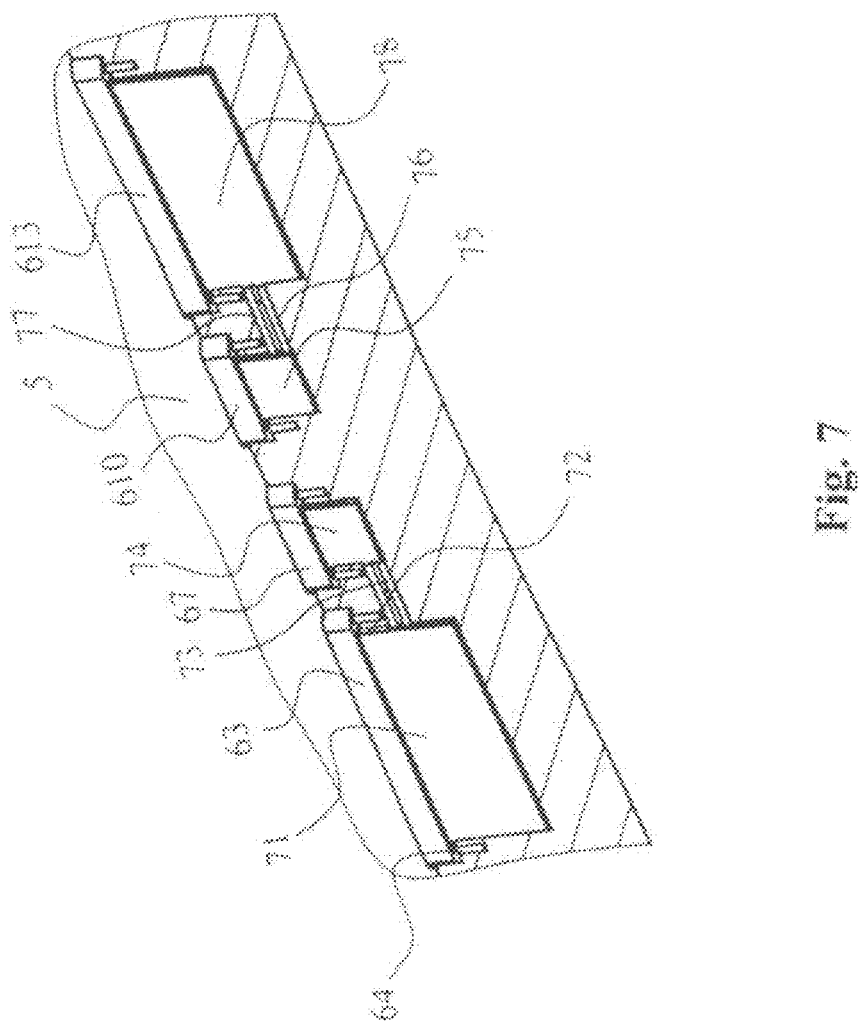
FIG. 7 is a cutaway view of the RFID tags and the batteries embedded inside the groove on the plate of the pallet.

FIG. 7 is a cut away view to show how the RFID tags and batteries are fixed on the plate 5 of the pallet. The active RFID tag 71 is embedded into the groove and fixed with the lid 63 by plastic screw 64. The battery 74 is embedded to the groove and fixed with the lid 67 by plastic screw 64. The lines 72 and 73 link the positive electrode and negative electrode of the battery 74 to power the active RFID tag 71. The Semi-passive RFID tag 78 is embedded into the groove and fixed by the lid 613 with plastic screw 64. The battery 75 is embedded to the groove and fixed with the lid 610 by plastic screw 64. The lines 76 and 77 link the positive electrode and negative electrode of the battery 75 to power the semi-passive RFID tag 78.

Figure 8:
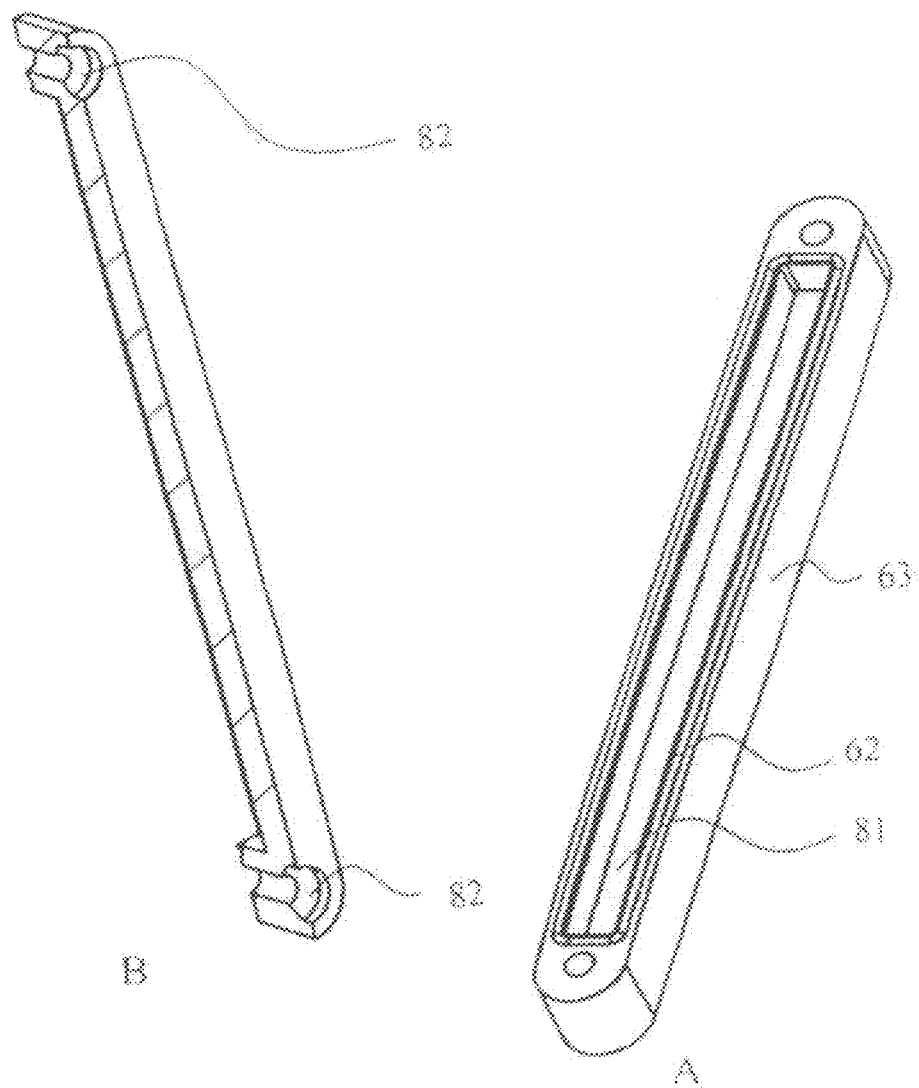
FIG. 8A shows a front view of the lid and FIG. 8B is a cutaway view of the lid.

FIG. 8 A is the front view of the lid 63 used to fix the active RFID tag, semi-passive RFID tag and the batteries into the grooves 61, 65, 68 and 611 (as shown in FIG. 6) on the plate 5 of the pallet. The sealing washer 62 is inserted to the tiny shallow groove on the lid 61, 65, 68 and 611 (as shown in FIG. 6). The groove 81 is used to fix one end of the active RFID tags 71 or the semi-passive RFID tag 78 or the battery 74 and 75.

FIG. 8 B is the cut away view of the lid 63 used to fix the active RFID tag, the semi-passive RFID tag and the batteries into the grooves 61, 65, 68 and 611 on the plate 5 of the pallet. The step groove 82 on both sides of the lid 63 are used for plastic screws 64 to fix the lid with plate 5.

FIG. 9 shows a fully folded RFID tag(s) equipped pallet. The supporting legs 2 are folded 90 degree, from the supporting position, to the grooves 10 on the plate 5 of the pallet. All belts 6 are recovered to the grooves 12. The outside end of the recovered belt 21 is tidily held by the round metal plate 27 connected with the groove 31 on the flank of the plate 5 of the pallet. All other functional parts, like the passive RFID tag 210, the active RFID tag, the semi-passive RFID tag, the batteries are fixed in the area 4. The nut 7 is fixed on the flank of the plate 5 of the pallet at the same level and no any part is uncovered or raised when the pallet is fully folded.

Still other objects, features, and attendant advantages of the present invention will become apparent to those skilled in the art from the reading of the above detailed embodiments constructed in accordance therewith, taken in conjunction with the accompanying drawings. While the invention has been described in connection with a preferred embodiment, it is not intended to limit the scope of the invention to the particular form set forth, but on the contrary, it is intended to cover such alternatives, modifications, and equivalents as may be included within the spirit and scope of the invention as defined by the appended claims.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention described by the foregoing includes all changes that come within the meaning, range and equivalence thereof and is intended to be embraced therein.

We claim:

1. A collapsible, reusable and repairable pallet comprising:
   a plurality of adjoining plates connected together to form the pallet;
   each plate of the plurality of adjoining plates comprising concave or convex structures wherein a plate of the plurality of adjoining plates with convex structures is coupled to a plate of the plurality of adjoining plates with concave structures by inserting the convex structures into the concave structures;
   each plate of the plurality of adjoining plates with at least two penetrative holes, the penetrative holes formed on perpendicular sides of the plate, wherein the penetrative holes of adjoining plates align;
   at least two rotatable legs, each leg having a convex upper portion with a penetrative hole, and a bottom portion having support shoulders;
   at least two joint shafts having two threaded ends;
   wherein a first joint shaft of the at least two joint shafts passes through the aligning penetrative holes of adjacent plates to fasten the adjacent plates together while passing through the penetrative hole of a leg of the at least two rotatable legs such that the leg rotates about the joint shaft from a first position stored within a first groove formed within a plate of the plurality of adjoining plates to a second extended position wherein the leg supports the plate on the support shoulders such that the plate is elevated from the ground;
   and
   wherein a second joint shaft of the at least two joint shafts passes through the aligning penetrative holes of adjacent plates to fasten the adjacent plates together, the first joint shaft and the second joint shaft are perpendicular to each other;
   at least one second threaded groove housing a nut which is connected to one of the treaded ends of a joint shaft and the second threaded groove;
   at least one third groove, each third groove housing a belt for securing cargo to the pallet;
   at least one fourth groove, each fourth groove housing a radio frequency identification tag;
   and at least one fifth groove, each fifth groove housing a battery.

2. The pallet in accordance with claim 1, wherein the coupled convex and concave structures of the plurality of adjoining plates are fixed by screws on both sides.

3. The pallet in accordance with claim 1, wherein each joint shaft is removably secured by the threaded ends with threads on the nut, wherein the joint shaft is made of a different material from the plurality of adjoining plates to support the plurality of adjoining plates.

4. The pallet in accordance with claim 1, wherein the at least one third groove is located near the edge of a plate of the plurality of adjoining plates, wherein the at least one third groove has a fixed rod to hold one end of the belt, and a pass-through opening on the front side, wherein the pass-through opening is a directing groove used to pull the other end of the belt from the at least one third groove or to recover the belt from outside the at least one third groove, wherein there is a round metal convex on the outside end of the belt, wherein the round metal convex is used to mate with a correspondence round groove under the directing groove on a plate of the plurality of adjoining plates.

5. The pallet in accordance with claim 1, wherein the convex upper portion of each leg of the at least two rotatable legs has a convex structure that is a 45 degree curve from a front plane to a top plane of the upper portion of the leg and the opposite back top portion is a vertical plane, wherein the support shoulders meet with the bottom of a plate of the plurality of adjoining plates when the leg is fully opened, wherein the supporting shoulders have a concave structure to allow a forklift to lift the pallet, wherein the supporting legs are marked with "PUSH DOWN" on the top plane and "PUSH UP" on the bottom plane when the supporting legs are fully folded.

6. The pallet in accordance with claim 5, wherein the at least two rotatable legs are collapsible within a plate of the plurality of adjoining plates and are rotatable 90 degrees from the plate.

7. The pallet in accordance with claim 5, wherein each leg of the at least two rotatable legs has a concave structure on the bottom and the corresponding first groove on the plate of the plurality of adjoining plates has a convex structure, wherein the convex structure allows the supporting leg to be secured within the first groove when the leg is fully collapsed.

8. The pallet in accordance with claim 5, wherein a back of each leg of the at least two rotatable legs has an oblique section on the bottom or the bottom of the first groove has an oblique section to allow each leg of the at least two rotatable legs to be pushed out from the first groove or to be fully collapsed within the first groove.

9. The pallet in accordance with claim 1, wherein the radio frequency identification tags include batteries and one of: an active radio frequency identification tag, a semi-passive radio frequency identification tag or a passive radio frequency identification tag, wherein each tag and each battery is removably attached to the corresponding fourth and fifth grooves on a plate of the plurality of adjoining plates.

10. The pallet in accordance with claim 9, wherein the radio frequency identification tag is a passive radio frequency identification tag and it is inserted into a narrow groove on a rectangle plastic plate, wherein the rectangle plastic plate is embedded into the fourth groove, wherein the passive radio frequency identification tag with the rectangle plastic plate is further fixed to a plate of the plurality of adjoining plates by plastic screws.

11. The pallet in accordance with claim 9, wherein the radio frequency identification tag is a semi-passive RFID tag and it is held by a lid and then embedded into the fourth groove on the top side or on the flank portion of a plate of the plurality of adjoining plates, wherein there is a sealing washer between the lid and the fourth groove on the plate, wherein the lid holding the semi-passive radio frequency identification tag is further fixed by screws.

12. The pallet in accordance with claim 9, wherein the radio frequency identification tag is an active tag and is held by a lid and embedded in the fourth groove on the top side or on the flank portion of a plate of the plurality of adjoining plates, wherein there is a sealing washer between the lid and the fourth groove on the plate, wherein the lid is further fixed to a plate of the plurality of adjoining plates by plastic screws.

13. The pallet in accordance with claim 9, wherein the radio frequency identification tag is an active radio frequency identification tag or a semi-passive radio frequency identification tag; wherein the batteries are the power source for the active radio frequency identification tag or the semi-passive radio frequency identification tag, wherein the fifth groove is waterproof, wherein the batteries are further coupled to the active or semi-passive radio frequency identification tag by wires, wherein the batteries are further fixed with a lid and a sealing washer to the fifth groove on a plate of the plurality of adjoining plates.

14. The pallet in accordance with claim 9, wherein the radio frequency identification tag is an active radio frequency identification tag or a semi-passive radio frequency identification tag; wherein the radio frequency identification tag and the batteries are enclosed within an anti-collision and anti-vibration material so as to protect the enclosed radio frequency identification tag and the batteries from damage.

15. The pallet in accordance with claim 1, wherein the pallet combines with a collapsible and reusable container.

16. The pallet in accordance with claim 1, whereby a plate of the plurality of adjoining plates, the belt, the at least two rotatable legs, the at least two joint shafts, the radio frequency identification tag and the batteries can be replaced with a new part if damaged.

17. A collapsible, reusable and repairable pallet comprising:
 a plate;
 the plate with at least two penetrative holes, the penetrative holes formed on perpendicular sides of the plate;
 at least two rotatable legs, each leg having a convex upper portion with a penetrative hole, and a bottom portion having support shoulders;
 at least two joint shafts having two threaded ends;
 wherein a first joint shaft of the at least two joint shafts passes through the penetrative holes of the plates and passes through the penetrative hole of a leg of the at least two rotatable legs such that the leg rotates about the joint shaft from a first position stored within a first groove formed within the plate to a second extended position wherein the leg supports the plate on the support shoulders such that the plate is elevated from the ground; and
 wherein a second joint shaft of the at least two joint shafts passes through the penetrative holes of the plate, the first joint shaft and the second joint shaft are perpendicular to each other;
 at least one second threaded groove housing a nut which is connected to one of the treaded ends of a joint shaft and the second threaded groove;
 at least one third groove, each third groove housing a belt for securing cargo to the pallet;
 at least one fourth groove, each fourth groove housing a radio frequency identification tag;
 and at least one fifth groove, each fifth groove housing a battery.

18. The pallet in accordance with claim 17, wherein each joint shaft is removably secured by the threaded ends with threads on the nut, wherein the joint shaft is made of a different material from the plate.

19. The pallet in accordance with claim 17, wherein the at least one third groove is located near the edge of the plate, wherein the at least one third groove has a fixed rod to hold one end of the belt, and a pass-through opening on the front side, wherein the pass- through opening is a directing groove used to pull the other end of the belt from the at least one third groove or to recover the belt from outside the at least one third groove, wherein there is a round metal convex on the outside end of the belt, wherein the round metal convex is used to mate with a correspondence round groove under the directing groove on the plate.

20. The pallet in accordance with claim 17, wherein the convex upper portion of each leg of the at least two rotatable legs has a convex structure that is a 45 degree curve from a front plane to a top plane of the upper portion of the leg and the opposite back top portion is a vertical plane, wherein the support shoulders meet with the bottom of the plate when the leg is fully opened, wherein the supporting shoulders have a concave structure to allow a forklift to lift the pallet, wherein the supporting legs are marked with "PUSH DOWN" on the top plane and "PUSH UP" on the bottom plane when the supporting legs are fully folded.

21. The pallet in accordance with claim 20, wherein the at least two rotatable legs are collapsible within the plate and are rotatable 90 degrees from the plate.

22. The pallet in accordance with claim 20, wherein each leg of the at least two rotatable legs has a concave structure on the bottom and the corresponding first groove on the plate has a convex structure, wherein the convex structure allows the supporting leg to be secured within the first groove when the leg is fully collapsed.

23. The pallet in accordance with claim 20, wherein a back of each leg of the at least two rotatable legs has an oblique section on the bottom or the bottom of the first groove has an oblique section to allow each leg of the at least two rotatable legs to be pushed out from the first groove or to be fully collapsed within the first groove.

24. The pallet in accordance with claim 17, wherein the radio frequency identification tags include batteries, and one of: an active radio frequency identification tag, a semi-passive radio frequency identification tag or a passive radio frequency identification tag; wherein each tag and each battery is removably attached to the corresponding fourth and fifth grooves on the plate.

25. The pallet in accordance with claim 24, wherein the radio frequency identification tag is a passive radio frequency identification tag and it is inserted into a narrow groove on a rectangle plastic plate, wherein the rectangle plastic plate is embedded into the fourth groove, wherein the passive radio frequency identification tag with the rectangle plastic plate is further fixed to the plate by plastic screws.

26. The pallet in accordance with claim 24, wherein the radio frequency identification tag is a semi-passive RFID tag and it is held by a lid and then embedded into the fourth groove on the top side or on the flank portion of the plate, wherein there is a sealing washer between the lid and the fourth groove on the plate, wherein the lid holding the semi-passive radio frequency identification tag is further fixed to the plate by screws.

27. The pallet in accordance with claim 24, wherein the radio frequency identification tag is an active tag and is held by a lid and embedded in the fourth groove on the top side or on the flank portion of the plate, wherein there is a sealing washer between the lid and the fourth groove on the plate, wherein the lid is further fixed to the plate by plastic screws.

28. The pallet in accordance with claim 24, wherein the radio frequency identification tag is an active radio frequency identification tag or a semi- passive radio frequency identification tag; wherein the batteries are the power source for the active radio frequency identification tag or the semi-passive radio frequency identification tag, wherein the fifth groove is waterproof, wherein the batteries are further coupled to the active or semi-passive radio frequency identification tag by wires, wherein the batteries are further fixed with a lid and a sealing washer to the fifth groove on the plate.

29. The pallet in accordance with claim 24, wherein the radio frequency identification tag is an active radio frequency identification tag or a semi-passive radio frequency identification tag; wherein the radio frequency identification tag and the batteries are enclosed within an anti- collision and anti-vibration material so as to protect the enclosed radio frequency identification tag and the batteries from damage.

30. The pallet in accordance with claim 17, wherein the pallet combines with a collapsible and reusable container.

31. The pallet in accordance with claim 17, whereby the plate, the belt, the at least two rotatable legs, the at least two joint shafts, the radio frequency identification tag and the batteries can be replaced with a new part if damaged.

* * * * *